United States Patent Office 3,339,473
Patented Sept. 5, 1967

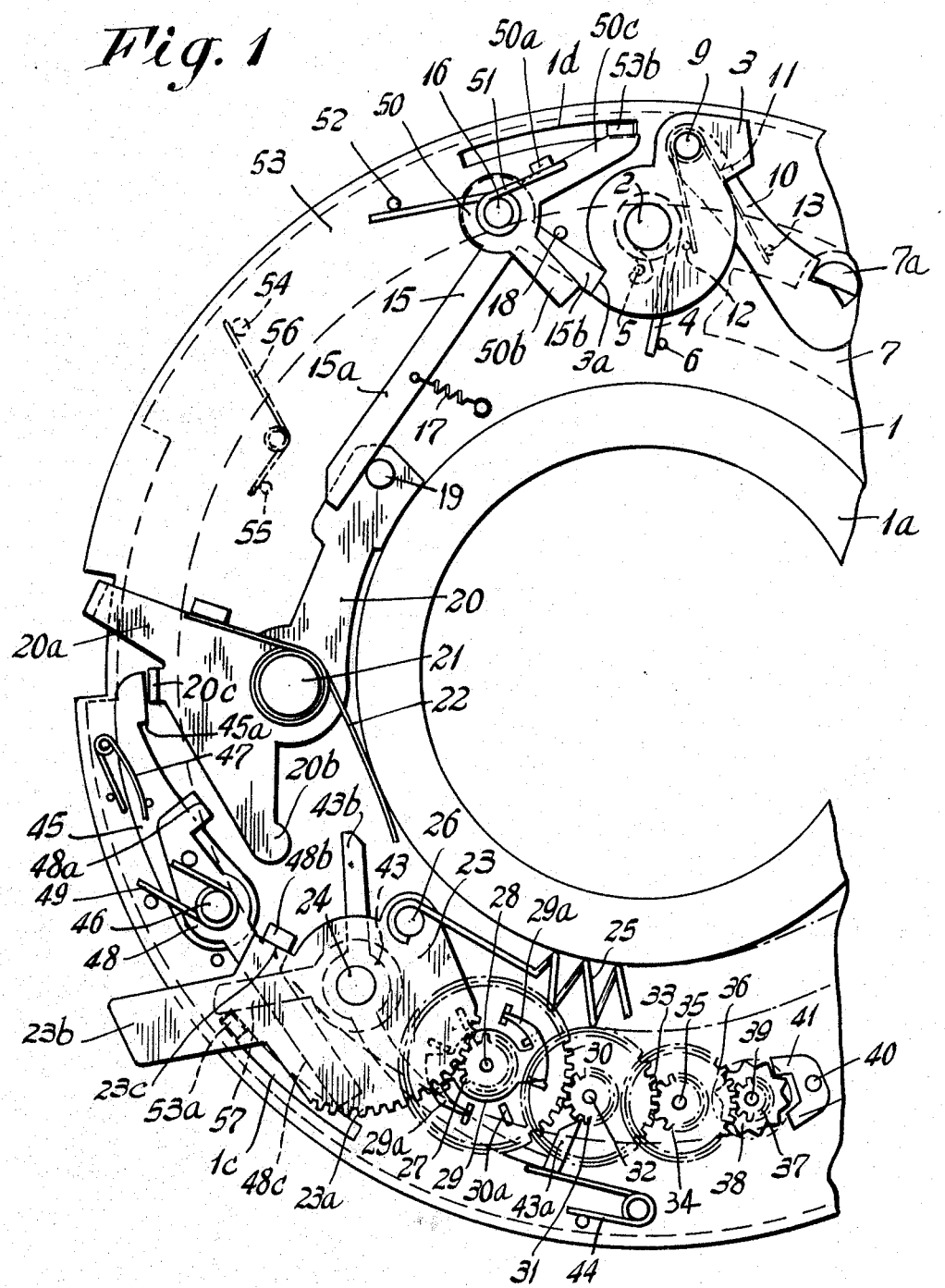

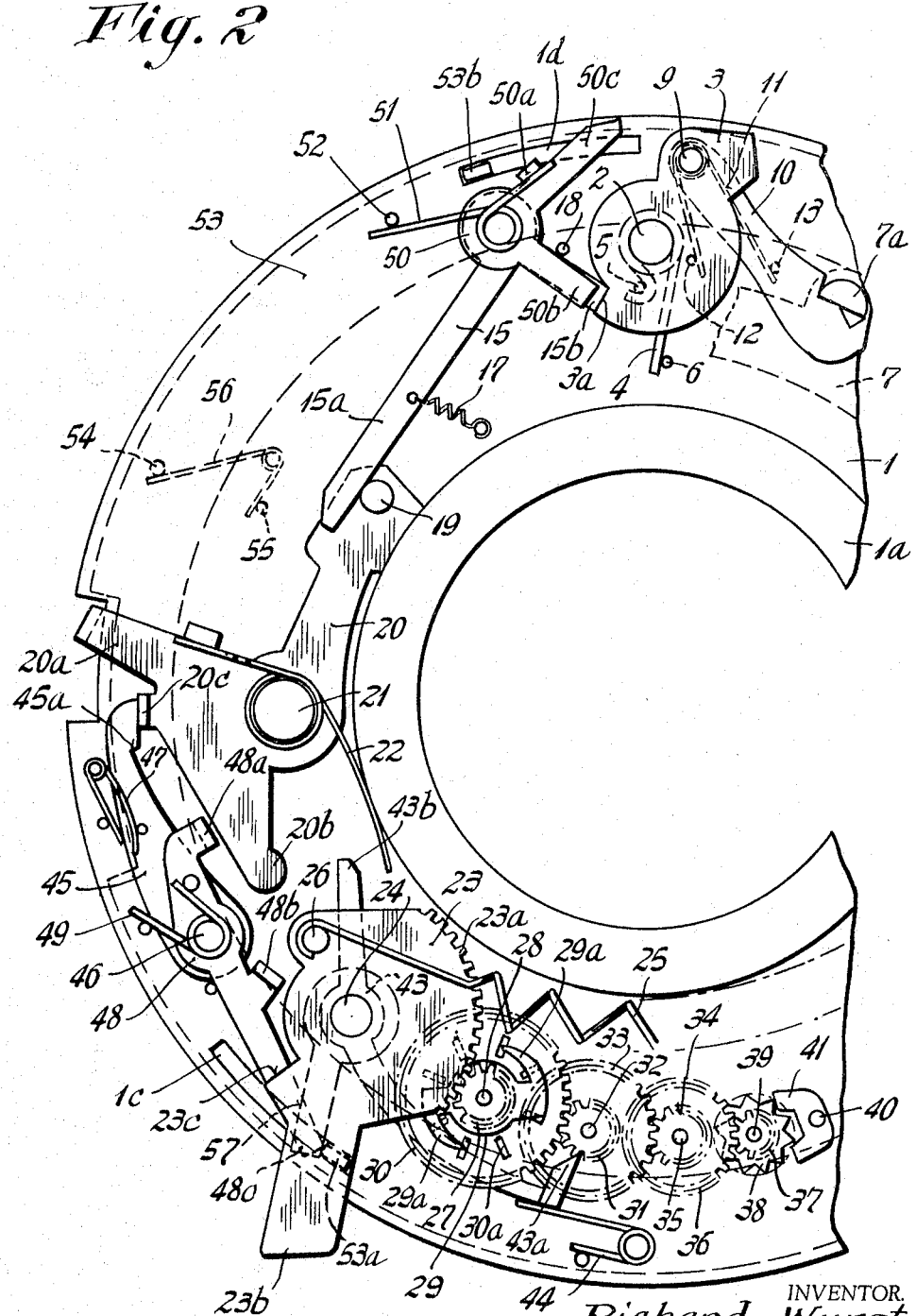

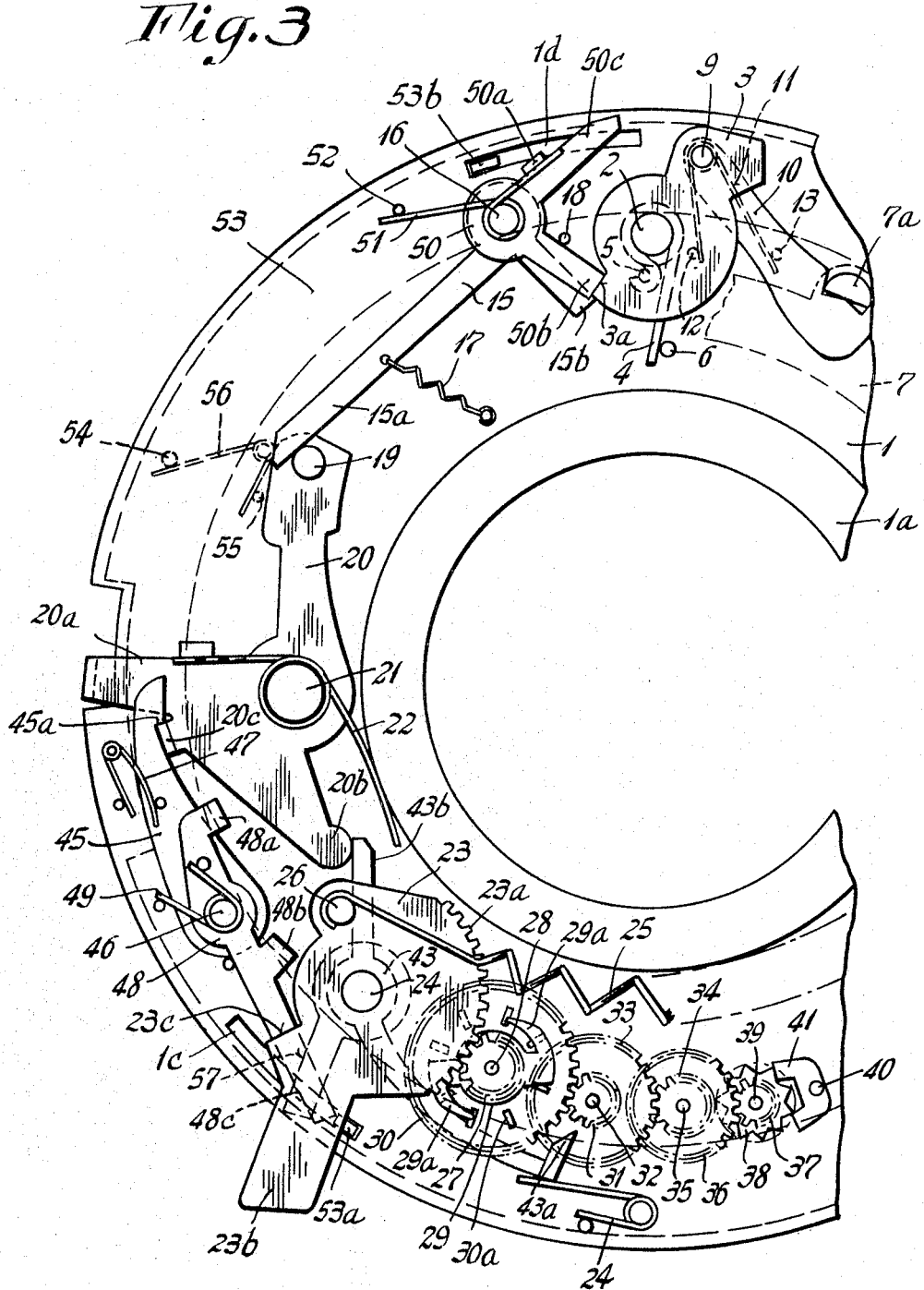

3,339,473
PHOTOGRAPHIC INTRA-LENS SHUTTER WITH DELAYED ACTION DEVICE
Richard Wurster, Hofen (Enz), Germany, assignor to Alfred Gauthier G.m.b.H., Calmbach (Enz), Germany, a corporation of Germany
Filed Feb. 8, 1965, Ser. No. 431,081
Claims priority, application Germany, Feb. 15, 1964, G 39,860
7 Claims. (Cl. 95—53.3)

ABSTRACT OF THE DISCLOSURE

The present invention relates to a photographic intra-lens shutter having a delayed action device and means for selectively cocking the delayed action device and in addition, a shutter blade driving mechanism and a shutter release. The intra-lens shutter has a first arresting means responsive to the shutter release for restraining the shutter blade driving mechanism and for releasing the shutter blade driving mechanism upon actuation of the shutter release. A second arresting means is provided for maintaining the restraint upon the shutter blade driving mechanism after the first arresting means has released the shutter blade driving mechanism and until the delayed action device has run down. Further, the intra-lens shutter has a biased release mechanism responsive to the delayed action device for positioning the second arresting means to maintain strain upon the shutter blade driving mechanism when the delayed action device is cocked and after release of the shutter blade driving mechanism by the first arresting means and for actuating the second arresting means to release the shutter blade driving mechanism after the delayed action device has run down.

---

The present invention relates to a photographic intra-lens shutter with a selectively connectable spring-driven delayed action device and a locking device associated with the shutter blade driving member. The locking device consists of a first arresting lever, which releases the shutter blade driving member upon actuation of the shutter release lever, and a second arresting lever, which maintains a restraint upon the driving member, but is moved out of the arresting or locked position after the delayed action device has run down.

In order to restrain the shutter blade driving member during the run-down of the delayed action device, one well known shutter arrangement is equipped with a lever system which is retained in locked condition by a control disc or disc cam which runs down with the gear members of the delayed action device. An end member of the lever system, facing the delayed action device and controlled by the delayed action device, abuts against the moving disc cam. Since the end member engages the rotating disc cam under continuous pressure during the run-down of the delayed action device, considerable frictional resistances necessarily occur in the delayed action device. Thus, there is the inherent risk that the run-down of the delayed action device may be interfered with or even completely interrupted. Other well known shutters provided with delayed action devices retain the shutter blade driving member in the locked condition after the shutter has been released by another locking device. This condition persists for an appreciable length of time until a gear in the delayed action device disengages the locking device at the end of the run-down of the delayed action device. This arrangement has the disadvantage that the delayed action device itself has to release the locking device which is under a comparatively high pressure and this release must occur at a moment at which the moment of rotation for the drive is comparatively small.

The present invention avoids the disadvantages and limitations mentioned above and has an object to provide an improved shutter having a delayed action device which is able to run down without interfering or arresting influences and which has a dependable release of the locking device that retains the shutter blade driving member in the locked condition during the run-down of the delayed action device.

To this end, the invention provides a spring-driven and freely movable guided release member which can be moved into cocked condition together with the delayed action device and can be restrained in this condition by means of a supporting lever until the run-down of the delayed action device has ended. Furthermore, the release device, released by the supporting lever at the end of the run-down of the delayed action device, is provided with a stop which, in the end phase of the run-down of the release device, pushes a second arresting lever out of the restraining condition and keeps the second arresting lever out of the restraining condition in the starting position of the release member. As a result, the gears in the delayed action device are able to run down without interfering influencies which result, for example from the fact that locking members act on one of the gears. In addition, release of the arresting lever, which retains the driving member in cocked condition is insured because release by the release member is not carried out merely by a static moment of rotation, as is the case in the known arrangements. Instead, the potential energy of the driving spring of the release member available at the moment of actuating the second arresting lever and the kinetic energy inherent in the release member during its motion is available for releasing the arresting lever. Another advantage of the arrangement of the present invention is that both the shutter blade driving member and the delayed action device can be arranged in the shutter housing so as to provide flexibility and freedom of choice; that is, they can be installed as conditions require. It is also advantageous to form the spring-driven release member as a ring, for example, in an intra-lens shutter in which the individual structural elements are arranged angularly about the lens assembly.

Details of the invention will become apparent from the specification which follows and from the accompanying drawing which illustrates one embodiment of the invention, and in which:

FIG. 1 is a partial top view of the base plate of an intra-lens shutter provided with a delayed action device. The shutter blade driving mechanism is shown in the cocked condition, while the delayed action device and the release member associated with the delayed action device are shown in the uncocked starting position;

FIG. 2 shows the shutter arrangement of FIG. 1 with the delayed action device cocked, but still prevented from running down. The driving spring of the delayed action device as well as the spring acting on the release member are cocked; and FIG. 3 shows the shutter arrangement of FIGS. 1 and 2 after release with the delayed action device run-down. The release device actuating the locking device of the shutter blade drive member is still in locked condition.

Referring to the drawings, an intra-lens shutter according to the present invention includes a base plate 1 and a cocking and driving shaft 2 rotatably mounted on the base plate. The cocking and driving shaft 2 is designed to be used as the shutter blade drive and has a driving disc 3 rigidly affixed thereto so that both the driving shaft and the driving disc rotate together about a common axis. A driving spring 4 acts on the driving disc 3 by having one of its ends abutting against a pin 5 arranged on the disc with the other end abutting against a fixed pin 6. A shutter blade driving ring 7 is arranged (for the view in the drawings) on the bottom side of the base plate 1 and is positioned concentrically with the tubular socket 1a. The shutter blade driving ring 7 is capable of rotating relative to the tubular socket 1a. The ring 7 carries a coupling pin 7a which is acted on, in a well known manner, by a driving pawl 10 articulately connected to the driving disc 3 by means of a pivot pin 9. In order to keep the driving pawl 10 in engagement with the coupling pin 7a, a spring 11 is provided which is wound about the articulated pin 9 so that one end engages a pin 12 on the driving disc 3 and the other end engages a pin 13 on the driving pawl 10. The arrangement of the aforementioned shutter blade drive is such that a reciprocating motion is imparted to the shutter blade ring 7 by means of the driving pawl 10 when the driving disc 3 runs down, thus opening and then closing the shutter blades (not shown in the drawing).

In order to be able to retain the driving disc 3 in cocked position, the invention provides for an L-shaped arresting lever 15 which is positioned on a pin or pivot 16. A spring 17 acts on the lever arm 15a of the arresting lever 15, keeping the arresting lever in locked or arrested position, whereby the lever arm 15b of the arresting lever comes into engagement with a fixed pin 18 and occupies a position in front of the projection 3a of the driving disc 3. In this position, the arm 15a of the arresting lever 15 is located in the path of motion of a pin 19 on a lever 20 provided for the purpose of releasing the shutter. The shutter release lever 20 is rotatably mounted on a pivot pin 21 on the base plate 1 and is acted upon by a spring 22 which tends to keep the release lever in the position shown in FIGS. 1 and 2. This position corresponds to the starting position. The arm 20a of the shutter release lever 20 may be operatively connected to the release member of the camera in a well known manner.

Also provided on the base plate 1 is a delayed action device of conventional construction and operation. This delayed action device comprises a cocking segment gear 23 which is provided with teeth 23a and a fingerpiece 23b. The cocking segment 23 is rotatably mounted on a shaft 24. A tension spring 25 acts on a pin 26 on the cocking segment 23. The free end of the tension spring 25 is suspended from a fixed pin which is not shown in the drawing. Meshing with the teeth 23a is a pinion 27 which is rotatably mounted on a shaft 28. Rigidly affixed to the pinion 27 and rotatable therewith about a common axis is a coupling disc 29 having two diametrically opposed elastic lugs 29a, 29a. The elastic lugs 29a, 29a engage slots 30a in a gear 30 for one direction of rotation only. The arrangement is such that the lugs 29a, 29a slide over the slots 30a in the gear 30 during the cocking of the delayed action device with the result that the gear 30 and the other gears and pinions of delayed action device, operatively connected to the gear 30, do not move. On the other hand, if the cocking segment 23 rotates in the opposite direction, due to the tension or pulling effect of the spring 25, the lugs 29a, 29a engage the slots 30a and thereby establish an operative connection between the cocking segment 23 and the gear 30.

The gear 30 meshes with a pinion 31 which is rotatably mounted on a shaft 32. Rigidly affixed to the pinion 31 and rotatable therewith about a common axis is a gear 33. The gear 33, in turn, meshes with another pinion 34 mounted on a bearing shaft 35. Rigidly affixed to the pinion 34 and rotatable therewith about a common axis is a gear 36 which meshes with the pinion 37 of an anchoring gear 38 mounted on a shaft 39. An escapement anchor 41 which swings about a bearing pin 40 functions in the usual manner with the anchoring gear 38. The shafts on which the gears and pinions of the delayed action device are mounted may be held in two bearing plates which are not shown in the drawing. These bearing plates are usually affixed to the base plate 1.

In order to lock the delayed action device in the cocked position, a locking device is provided which acts, in a manner to be described in detail below, with one of the gears of the delayed action device and with the shutter release lever 20. The locking device comprises a two-armed lever 43 which is mounted coaxially with the cocking segment 23. At one end, the lever 43 is provided with a locking tooth 43a which, in the cocked state of the delayed action device, is locked, for example, in the teeth of the pinion 31 due to the action of a spring 44. The other end 43b of the lever 43 is located in the path of motion of an arm 20b of the shutter release lever 20 and which, during release and after the driving disc 3 has been released, lifts the locking tooth 43 out from the locked condition with the teeth of pinion 31, thereby releasing delayed action device for run-down.

In order to prevent the locking tooth 43a from returning to the starting or locked position immediately after the shutter release lever 20 had been released, an additional locking device is provided which restrains the shutter release lever 20 in the release position when the delayed action device is cocked. A one-armed locking lever 45, which is pivotally mounted on a shaft 46, is provided for this purpose. A spring 47 acts upon the locking lever 45. The locking lever is provided, at its free end, with an arresting edge 45a. When the shutter release lever 20 is depressed, the arresting edge 45a is capable of being in locked engagement beyond a lug 20c, but only if the delayed action device has previously been moved into its cocked condition. If the delayed action device is not in its cocked condition, the locking lever 45 cannot and must not become operative since the shutter release lever 20, after being released, must in no way be prevented from returning immediately to the starting position. For this purpose, a supporting lever 48 is appropriately arranged coaxially with a locking lever 45, and is driven with the locking lever. The supporting lever 48, acted upon by a coil spring 49, is provided with a bent lug 48a which keeps the locking lever 45 in the starting position as long as the cocked segment 23 of the delayed action device occupies the setting position shown in FIG. 1. The supporting lever 48 is supported by means of another lug 48b on a projection 23c of the cocked segment 23. The projection 23c is so arranged that it keeps the locking lever 45 out of engagement with the lug 20c of the shutter release lever 20 while the delayed action device remains in the uncocked position.

In order to prevent the shutter blade driving mechanism from running down after release has been effected and until the delayed action device has run down completely, the invention provides, in addition to the aforementioned first arresting lever 15, a second arresting lever 50 pivotally positioned coaxially with the first arresting lever 15. A spring 51 which abuts against a fixed pin 52 at one end and a lug 50a of the second arresting lever 50 at the other end tends to keep the second arresting lever 50 in the restraining position determined by the fixed pin 18. The second arresting lever 50 has two arms 50b and 50c. Arm 50b acts in conjunction with the projection 3a of the driving disc 3 and, in a manner to be described in detail below, arm 50c acts in conjunction with a member which serves to release the shutter blade drive mechanism after the delayed action device has run down. As is apparent from the drawings, the arm 50b of the second arresting lever 50 associated with the driving disc 3 is slightly shorter than the arm 15b of the first arresting lever 15. This is intended to produce the following effect. When the delayed action device is cocked, the driving disc 3, released for run-down by the first arresting lever, impinges immediately thereafter on the arm 50b of the second arresting lever 50 and is thereby blocked again.

A release member 53 is provided for the purpose of automatically releasing the driving disc 3 retained in the cocked position by the second arresting lever 50 while the delayed action device is running down. For the embodiment shown, the release member 53 is in the form of a ring which is rotatably moved in a guided member within the shutter, preferably at the rear of the base plate 1. The release member 53, acted upon by a comparatively strong driving spring 56 having one end abutting against a pin 54 and the other end against a fixed pin 55, can be moved into the cocked position together with the delayed action device. To this end, the release member 53 is provided with a driver member 53a and a stop 53b which is designed to actuate the second arresting lever 50. The stop 53b is guided in a slot 1d, while the driver member 53a is guided in a slot 1c. The stop 53b of the release member 53 acts in conjunction with the arm 50c of the second arresting lever 50 and prevents the second arresting lever, as is apparent from FIGURE 1, from assuming the locked condition when the delayed action device is not cocked. The driver 53a of the release member 53, on the other hand, acts in conjunction with a cocking arm 57 rigidly connected to the cocking segment 23 of the delayed action device. The cocking arm 57 moves the release member 53 during cocking of the delayed action device from the starting position illustrated in FIG. 1 into the cocked position illustrated in FIG. 2. The release member 53 is retained in this setting position by the cocking arm 57 until the delayed action device is released. After release, the arm 48c of the supporting lever 48 enters into the path of motion of the driver 53a, thereby preventing the release member 53 from running down. The release of the release member 53 is effected by the projection 23c of the cocking segment 23 which, at the end of the run-down of the delayed action device, runs against the lug 48b of the supporting lever 48 and rotates the supporting lever as well as the locking lever 45 in a counterclockwise direction, thereby moving both levers out of the locked condition. Up to this point, the locking lever 45 had been hooked in beyond the lug 20c of the release lever 20.

The shutter arrangement just described is operated in the following manner. Referring to FIG. 1, which illustrates the shutter in its cocked condition and the delayed action device in its uncocked condition, it will be noted that the second arresting lever 50 abuts against the stop 53b of the release member 53. This corresponds to the starting position. In this setting position of the delayed action device the locking lever 45, acting in conjunction with the shutter release lever 20, is supported on the lug 48b of the supporting lever 48. The lug 48b is seen to engage the cocking segment 23. When the shutter release lever 20 is depressed, the first arresting lever 15, being acted upon by the release lever, releases the driving disc 3 for run-down, whereby a reciprocating motion is imparted to the shutter blade driving ring 7 by way of the driving pawl 10. This causes the shutter blades to open and close.

If the release of the driving disc is not to take place immediately upon actuation of the shutter release lever 20, but only after a certain delay, the delayed action device must be moved into its cocked condition. This is done by moving the fingerpiece 23b of the cocking segment 23 from the position illustrated in FIG. 1 into the position illustrated in FIG. 2. FIG. 2, which shows both the shutter blade drive and the delayed action device in cocked condition, clearly illustrates that the driver member 53a of the release member 53 is moved by means of the cocking arm 57 during the cocking of the delayed action device. The release member 53 being moved against the action of the spring 56, is thereby displaced in such a manner that the arm 48c of the supporting lever 48 is able to move into a position in front of the driver member 53a of the release member. The cocking motion of the release member 53 also withdraws the support from the second arresting lever 50, with the result that the arm 50b moves into the locked position limited by fixed pin 18 due to the action of the spring 51.

When the shutter is released by pressure on the shutter release lever 20, the first arresting lever 15 will first be moved out of the arresting or locking position as illustrated in FIG. 3. Consequently, the driving disc 3 is released for a moment, but immediately engages the arm 50b of the second arresting lever 50 by means of its projection 3a. Thus, the driving disc 3 is again blocked. Simultaneously with the release of the driving disc by the first arresting lever 15, the self timer is released for rundown by the action of the arm 20b of the shutter release lever 20 on the arm 43b of the lever 43. In addition, the release lever itself is blocked in the release condition by the action of the locking edge 45a of the locking lever 45 on the lug 20c.

Since the tension spring 25 of the delayed action device acts directly on the cocking sement 23, the cocking segment takes part in the run-down of the delayed action device. The projection 23c of the cocking segment 23 thus approaches the lug 48b of the supporting lever 48 and finally runs against the supporting lever. The result produced is that the supporting lever 48 and the locking lever 45, engaged by the supporting lever, are rotated about the shaft 46 so that both the shutter release lever 20 and the release member 53 are released in the final phase of the run-down of the delayed action device. While this causes the shutter release lever 20 to return again to the starting position, the release member 53 is driven with greater acceleration due to the action of the driving spring 56 acting on the release member. During run-down, the release member 53 runs against the arm 50c of the arresting lever 50 and with the kinetic energy imparted to it pushes the arm 50c out of the arresting position. The driving disc 3, which as already indicated above, serves to open and close the shutter blades, is finally released for run-down.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:
1. A photographic intra-lens shutter comprising:
a delayed action device;
means for selectively cocking said delayed action device;
a shutter blade driving mechanism;
a shutter release;
first arresting means responsive to said shutter release for restraining said shutter blade driving mechanism and for releasing said shutter blade driving mechanism upon actuation of said shutter release;
second arresting means for maintaining the restraint upon said shutter blade driving mechanism after said first arresting means has released said shutter blade driving mechanism and until said delayed action device has run down;
and a biased release mechanism responsive to said delayed action device for positioning said second arresting means to maintain the restraint upon said shutter blade driving mechanism when said delayed action device is cocked and after release of said shutter blade driving mechanism by said first arresting means and for actuating said second arresting means to release said shutter blade driving mechanism after said delayed action device has run down.

2. A photographic intra-lens shutter according to claim 1 wherein the release mechanism is in the form of a ring.

3. A photographic intra-lens shutter comprising:
a spring driven delayed action device;

means for selectively cocking said delayed action device;
a shutter blade driving member;
a shutter release lever;
a first arresting lever responsive to said shutter release lever for restraining said shutter blade driving member and for releasing said shutter blade driving member upon actuation of said shutter release lever;
a second arresting lever for maintaining the restraint upon said shutter blade driving member after said first arresting lever has released said shutter blade driving member and until said delayed action device has run down;
and a spring-driven and freely movable guided release member responsive to said delayed action device for positioning said second arresting lever to maintain the restraint upon said shutter blade driving member when said delayed action device is cocked and after release of said shutter blade driving member by said first arresting lever and for actuating said second arresting lever to release said shutter blade driving member after said delayed action device has run down.

4. A photographic intra-lens shutter comprising:
a spring-driven delayed action device;
a shutter blade driving member;
a shutter release lever;
a first arresting lever responsive to said shutter release lever for restraining said shutter blade driving member and for releasing said shutter blade driving member upon actuation of said shutter release lever;
a second arresting lever for maintaining the restraint upon said shutter blade driving member after said first arresting lever has released said shutter blade driving member and until said delayed action device has run down;
a spring-driven and freely movable guided release member for positioning said second arresting lever to maintain the restraint upon said shutter blade driving member when said delayed action device is cocked and after release of said shutter blade driving member by said first arresting lever and for actuating said second arresting lever to release said shutter blade driving member after said delayed action device has run down;
means for selectively cocking said delayed action device and said release member;
and a support lever responsive to said delayed action device for retaining said release member in cocked position until the run-down of said delayed action device is complete and for releasing said release member after said delayed action device has run down.

5. A photographic intra-lens shutter comprising:
a spring-driven delayed action device;
a shutter blade driving member;
a shutter release lever;
a first arresting lever responsive to said shutter release lever for restraining said shutter blade driving member and for releasing said shutter blade for driving member upon actuation of said shutter release lever;
a second arresting lever for maintaining the restraint upon said shutter blade driving member after said first arresting lever has released said shutter blade driving member and until said delayed action device has run down;
a spring-driven and freely movable guided release member for positioning said second arresting lever to maintain the restraint upon said shutter blade driving member when said delayed action device is cocked and after release of said shutter blade driving member by said first arresting lever and for pushing said second arresting lever out of the arresting position to release said shutter blade driving member after said delayed action device has run down;
means for selectively cocking said delayed action device and said release member;
and a support lever responsive to said delayed action device for retaining said release member in cocked position until the run-down of said delayed action device is complete and for releasing said release member after said delayed action device has run down.

6. A photographic intra-lens shutter according to claim 5 wherein the release member continues to maintain the second arresting lever out of the arresting position after the release member comes to rest in the uncocked position.

7. A photographic intra-lens shutter according to claim 6 wherein the release member is in the form of a ring.

References Cited

UNITED STATES PATENTS

| | | | |
|---|---|---|---|
| 3,103,862 | 9/1963 | Kiper | 95—53.3 |
| 3,198,099 | 8/1965 | Mueller | 95—53.3 |
| 3,209,665 | 10/1965 | Eberl | 95—53.3 |

JOHN M. HORAN, *Primary Examiner.*